United States Patent
Inukai

[11] Patent Number: 6,097,006
[45] Date of Patent: Aug. 1, 2000

[54] FIXING UNIT FOR USE IN IMAGE FORMING DEVICE

[75] Inventor: Katsumi Inukai, Iwakura, Japan

[73] Assignee: Brother Kogyo Kabushiki Kaisha, Nagoya, Japan

[21] Appl. No.: 09/158,538

[22] Filed: Sep. 22, 1998

[30] Foreign Application Priority Data

Sep. 24, 1997 [JP] Japan .................................... 9-258883
Sep. 24, 1997 [JP] Japan .................................... 9-258885
Sep. 24, 1997 [JP] Japan .................................... 9-258886

[51] Int. Cl.[7] .................................................. H05B 1/02
[52] U.S. Cl. ............................................. 219/497; 339/69
[58] Field of Search .................................. 219/497, 216; 399/69, 70, 67

[56] References Cited

U.S. PATENT DOCUMENTS

| | | | |
|---|---|---|---|
| 5,109,255 | 4/1992 | Nishikawa et al. | 399/70 |
| 5,386,272 | 1/1995 | Nakazato | 399/33 |
| 5,682,576 | 10/1997 | Sakai et al. | 399/69 |
| 5,742,865 | 4/1998 | Yajima et al. | 399/43 |

FOREIGN PATENT DOCUMENTS

| | | |
|---|---|---|
| 0 740 223 A2 | 10/1996 | European Pat. Off. . |
| 0 875 804 A1 | 11/1998 | European Pat. Off. . |
| 04250484 | 7/1992 | Japan . |
| 6-286273 | 11/1994 | Japan . |
| 9-197892 | 7/1997 | Japan . |

*Primary Examiner*—Teresa Walberg
*Assistant Examiner*—Quang Van
*Attorney, Agent, or Firm*—Oliff & Berridge, PLC

[57] ABSTRACT

A fixing unit is used for fixing an toner image on a recording medium onto the recording medium. The fixing unit includes a heater which generates heat when supplied with an electric current. A control circuit selectively output a signal so as to turning ON and OFF a transistor. When the transistor is ON, the electric current is supplied to the heater. The signal output from the control circuit includes a pulse portion having pulses and a continues portion having no pulse. When the pulse portion is output, the electric current to the heater is intermittently disrupted. Because, a rush current generated in the electric current is also intermittently disrupted accordingly, flicker in lightning which is sharing a power source with the fixing unit can be prevented.

21 Claims, 10 Drawing Sheets

FIXING UNIT FOR USE IN IMAGE FORMING DEVICE

BACKGROUND OF THE INVENTION

1. Field of the Invention

The present invention relates to a fixing unit used in an image forming device for thermally fixing a toner image onto a recording medium.

2. Description of the Prior Art

There has been known an image forming device, such as a copy machine or a laser printer, for forming an image on a recording medium using an electrophotography method. In this type of image forming device, a toner image is formed on, for example, a photosensitive drum and transferred onto a recording medium. Then, the toner image is fixed onto the recording medium by a fixing unit. More specifically, the fixing unit includes a heating unit and an electrical supply unit. The electric supply unit selectively supplies electricity to the heating unit to heat up and maintain the heating unit at a predetermined temperature. Heat generated by the heating unit is applied to the recording medium and fix the toner image onto the recording medium.

FIG. 1 is a time chart showing a conventional process for controlling the temperature of the heating unit. In this example, the heating unit is a heat roller with a halogen lamp housed therein. The halogen lamp is electrically connected to the electric supply unit via a trielectrode AC switch (TRIAC). The temperature of the heat roller is detected by a thermistor attached to a peripheral surface of the heat roller. The TRIAC is selectively turned ON and OFF to control the temperature of the heat roller based on the detected temperature.

Specifically, as shown in FIG. 1, when the TRIAC is turned ON, a lamp current is supplied to the halogen lamp and the halogen lamp starts generating heat. The TRIAC is maintained ON until the temperature of the heat roller reaches a predetermined temperature tb. When the temperature of the heat roller reaches the temperature tb, the TRIAC is turned OFF so that the halogen lamp stops generating heat. The TRIAC is maintained OFF until the temperature of the heat roller reaches to a predetermined temperature ta. Then, when the temperature of the heat roller drops to the temperature ta, the TRIAC is again turned ON. These processes are repeated to maintain the temperature of the heat roller between the temperatures ta and tb.

However, as shown in FIG. 1, immediately after the TRIAC is turned ON, a large current called a rush current flows into the halogen lamp. When a lighting fixture shares a power source with the image forming device, the rush current causes a voltage drop in the lighting fixture. When this voltage drop is generated at a frequency of about 8.8 Hz, for example, an unpleasant flicker is generated in the lighting. In recent years, some fixing units includes lamps as large as 10 kW. The larger the lamp, the greater the voltage drop in the lighting fixture, which results in even more sever flickering in the lighting. Therefore, controlling the generation of flicker accompanied with rush currents is becoming a major issue.

SUMMARY OF THE INVENTION

In view of the foregoing, it is an object of the present invention to solve the above-described problems and also to provide an electrical equipment, such as a fixing device for use in an image forming device, capable of satisfactorily controlling generation of flicker.

It is an another object of the present invention to provide an electrical equipment capable of increasing its temperature efficiently and rapidly.

In order to achieve the above and other objectives, there is provided an electrical equipment including a power source, a switching unit, a driven unit, a detecting unit, and a control unit. The switching unit is selectively turned ON and OFF. The driven unit is connected to the power source via the switching unit. The detecting unit is coupled to the driven unit. The detecting unit detects a status of the driven unit and then outputs a status signal indicative of the status of the driven unit. The control unit outputs a first signal based on the status signal. The first signal has a first portion and a second portion following the first portion. The power source supplies an electric current to the driven unit when the switching unit is ON. The switching unit is intermittently turned ON and OFF in accordance with the first portion of the first signal, resulting in intermittently disrupting the electric current supplied to the driven unit. The switching unit is continuously maintained ON in accordance with the second portion of the first signal, resulting in continuously supplying the electric current to the driven unit.

There is also provided an electrical equipment including a heating unit, a temperature detecting unit, a control unit, and a switching unit. The heating unit generates heat. The temperature detecting unit detects a temperature of the heating unit. The control unit outputs a first signal based on the temperature detected by the temperature detecting unit. The first signal has a first portion and a second portion following the first portion. The switching unit is selectively turned ON and OFF based on the first signal. The switching unit supplies an electric current to the heating unit when the switching unit is ON, thereby causing the heating unit to generate heat. As a result, the switching unit is intermittently turned ON and OFF in accordance with the first portion of the first signal, thereby intermittently disrupting the electric current supplied to the heating unit. The switching unit is continuously maintained ON in accordance with the second portion of the first signal, resulting in continuously supplying the electric current to the heating unit.

Further, there is provided an electrical equipment including a heating unit, a temperature detecting unit, an operational mode, detecting unit, and a control unit. The heating unit generates heat. The temperature detecting unit detects temperature of the heating unit. The operational mode detecting unit detects a first mode and a second mode. The control unit controls the temperature of the heating unit to fall within a range from a first temperature to a second temperature lower than the first temperature when the operational mode detecting unit detects the first mode. The control unit controlling the temperature of the heating unit to fall within a range from a third temperature to a fourth temperature lower than the third temperature when the operational mode detecting unit detects the second mode. A difference between the third temperature and the forth temperature is greater than a difference between the first temperature and the second temperature.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

The present invention will be described with reference to an electrical equipment for use in an image forming device as a preferred embodiment of the present invention while referring to the accompanying drawings. This, of course, should be understood as merely illustrative of one example of electrical apparatuses to which the present invention is applicable, and not in any way limiting. The present invention is applicable to such electrical apparatuses that include including a power source, a switching unit, a driven unit, a detecting unit, and a control unit.

In the following description, the expressions "front", "rear", "left", "right", "upper", "lower", "above", and "beneath" are used throughout the description to define the various parts when the image forming device is disposed in an orientation in which it is intended to be used. In the present embodiments, a fixing unit for use in a laser printer is used as an example of the electric equipment.

Figure 1:
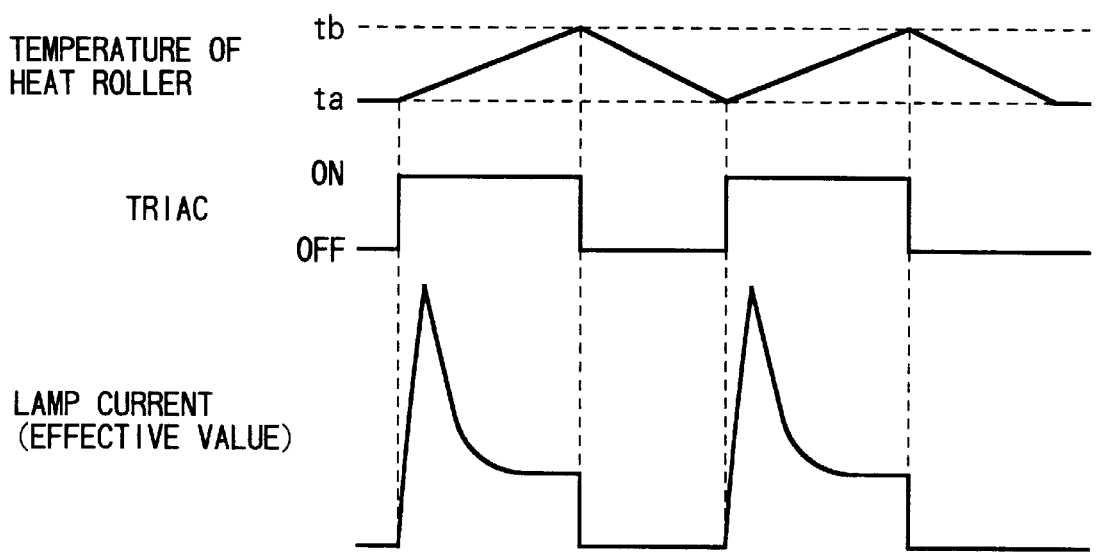
FIG. 1 is a time chart showing electrical control in a conventional toner image fixing device.
Figure 2:
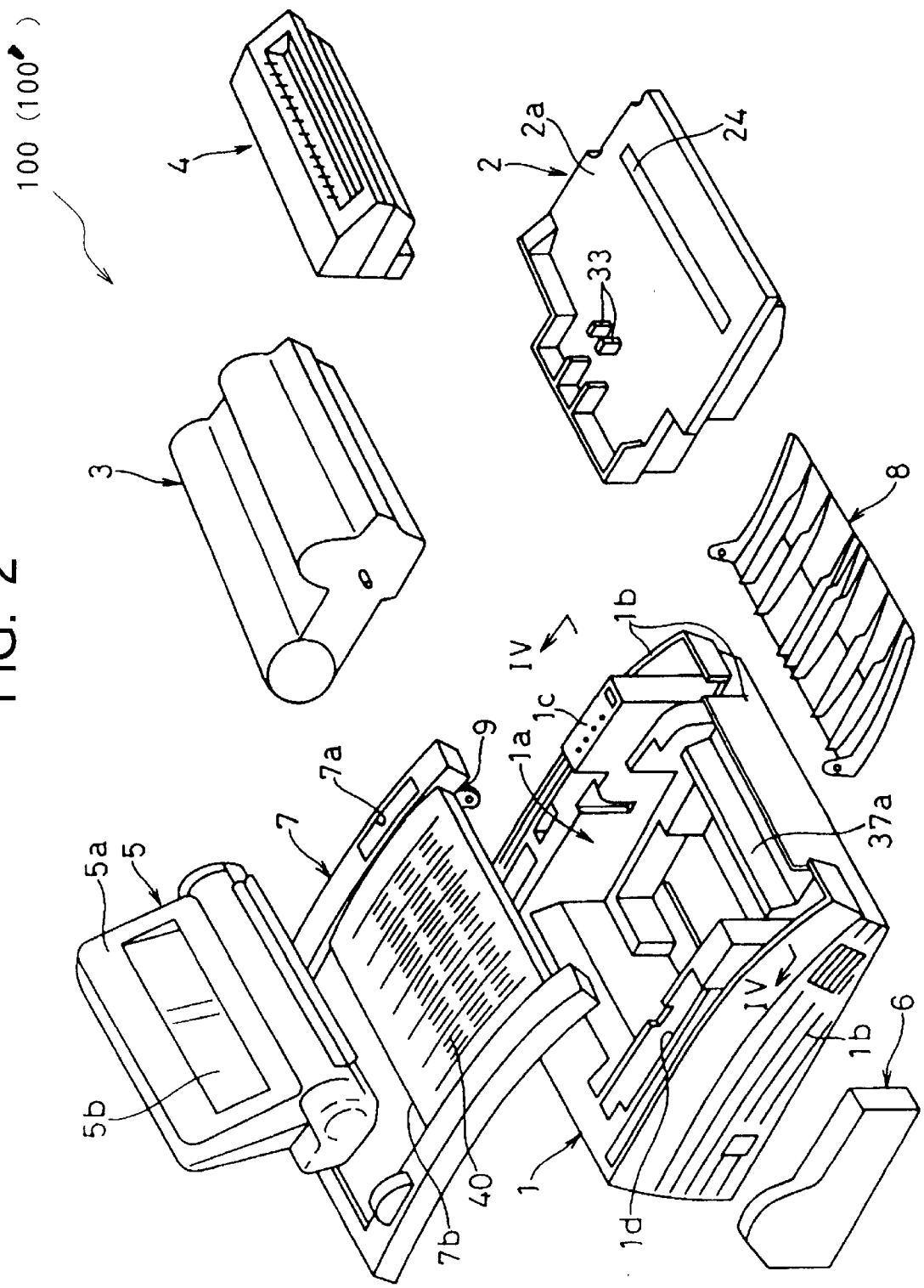
FIG. 2 is an exploded perspective view showing a laser printer including a fixing unit according to a first and second embodiments of the present invention.

As shown in FIG. 2, a laser printer 100 includes a case 1, a scanner unit 2, a process unit 3, a fixing unit 4, a sheet supply unit 5, a drive system unit 6, a top cover 7, and a discharge tray 8.

The case 1 is formed from a synthetic resin by injection molding techniques. The case 1 includes a main frame 1a and a main cover 1b integrally formed with the main frame 1a. The main frame 1 has a rectangular shape when viewed from above and has a front side portion, a rear side portion, a left side portion, a right side portion, and a bottom portion. The main cover 1b covers these side portions of the main frame 1a. The right side portion of the main frame 1a is formed with an upwardly protruding control panel portion 1c. A user can select various control modes for the laser printer 100 by operating the control panel portion 1c. The main cover 1b and the left side portion of the main frame 1 define a receiving slot 1d.

The top cover 7 is formed from a synthetic resin and provided for covering the case 1. The top cover 7 is formed with an opening 7a for receiving the operation panel portion 1c and an opening 7b for receiving the sheet supply unit 5. Protruding brackets 9 are formed on left and right sides at the front portion of the top cover 7. The brackets 9 are for pivotably movably supporting the discharge tray 8 so that the discharge tray 8 can be reclined against the top cover 7 when not in use.

Figure 4:
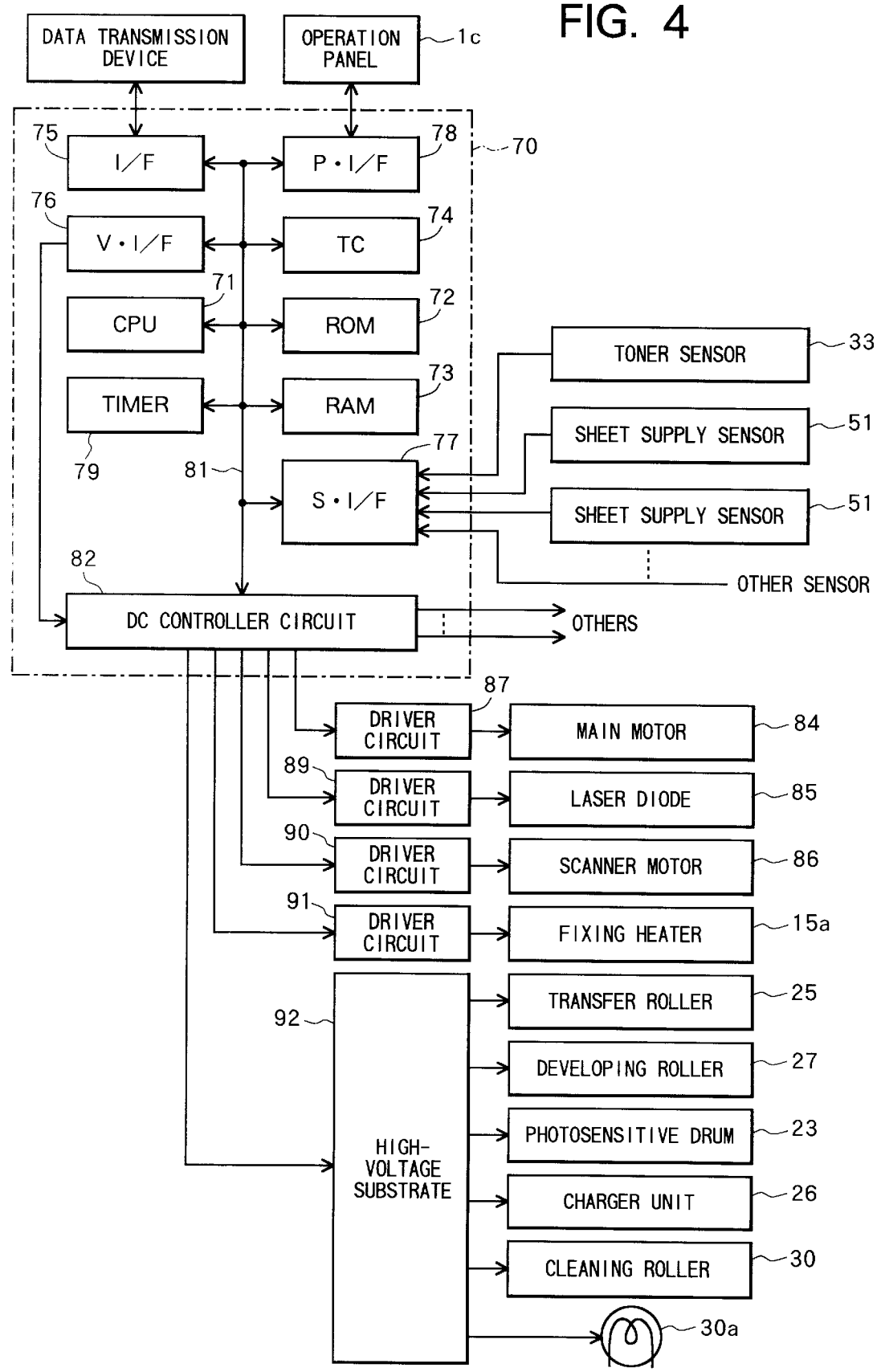
FIG. 4 is a block diagram showing a control unit and other electrical components of the laser printer of FIG. 2.

The drive system unit 6 includes a gear train (not shown) and a main motor 84 shown in FIG. 4. The drive system unit 6 is inserted into the receiving slot 1d from the underside of the main case 1 and is fixedly mounted therein.

Figure 3:
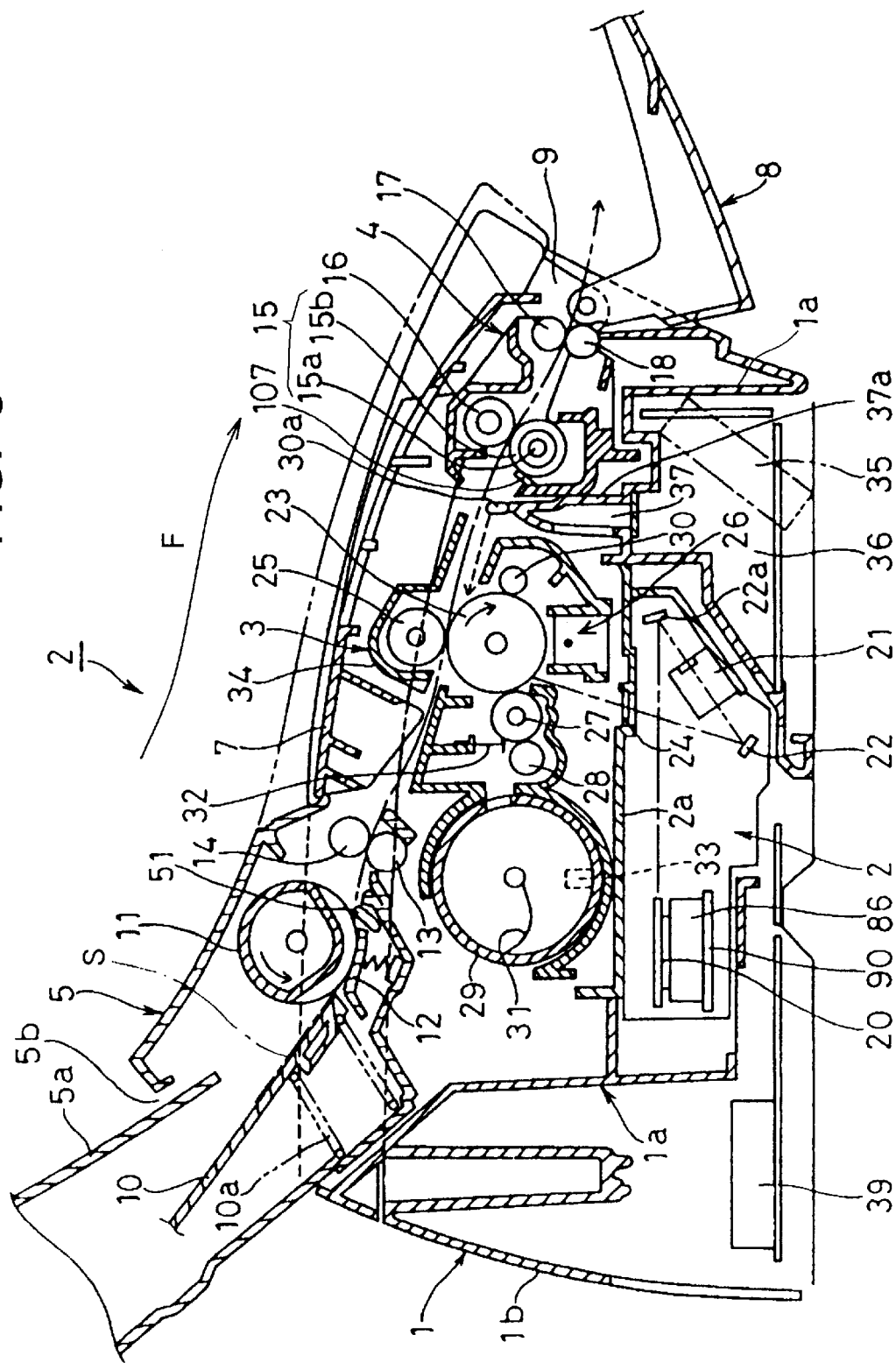
FIG. 3 is a cross-sectional view showing the laser printer of FIG. 2.

As shown in FIGS. 2 and 3, the sheet supply unit 5 is positioned at the upper rear end portion of the case 1. The process unit 3 is detachably mounted in the main frame 1a downstream from the sheet supply unit 5 in a sheet feed direction indicated by an arrow F. The scanner unit 2 is provided beneath the process unit 3. The fixing unit 4 is provided further downstream from the process unit 3 in the sheet feed direction F.

The sheet supply unit 5 is provided for supplying a recording sheet S to the process unit 3. As shown in FIGS. 2 and 3, the sheet supply unit 5 includes a feeder case 5a, a support plate 10, a spring 10a, a sheet supply roller 11, a separation pad 12, and a pair of register rollers 13, 14. A plurality of recording sheets S are supported in a stacked fashion on the support plate 10 within the feeder case 5a. The sheet supply roller 11 is provided adjacent to a lower end portion of the support plate 10. The driving system unit 6 is connected to the sheet supply roller 11 to drive rotation of the sheet supply roller 11. The separation pad 12 is disposed beneath the feed roller 11. The pair of the register roller 13, 14 are rotatably positioned at the downstream side of the sheet supply roller 11 in the sheet feed direction F. The sheet supply unit 5 is further formed with an upwardly-slanting manually-feed opening 5b through which a user can manually insert desired recording sheets.

The spring 10a urges the recording sheets S on the support plate 10 toward the sheet feed roller 11 so that leading edge of the uppermost recording sheet S is pressed against the sheet feed roller 11. When the sheet supply roller 11 is driven to rotate, the recording sheets S are fed one at a time in the sheet feed direction F and supplied to the register rollers 13, 14. Rotation of the resister rollers 13, 14 further transports the recording sheet S toward the process unit 3.

The scanner unit 2 is for reading an original image from an original document (not shown) and radiating laser beam corresponding to the original image. The scanner unit 2 includes a support plate 2a, a laser light unit (not shown), a polygon mirror 20, a lens 21, reflectors 22a, 22b, a glass plate 24, and a scanner motor 86 (FIG. 3). The support plate 2a is formed from a synthetic resin and is fixedly mounted by screws (not shown) onto a stay portion (not shown), which is integrally formed with the bottom portion of the main frame 1a. Although not shown in the drawings, the support plate 2a is formed with an elongated scanner slit extending in a direction perpendicular to the sheet surface of FIG. 3. The glass plate 24 is provided for covering the scanner split. The laser light unit includes a laser diode 85 (FIG. 5) for radiating the laser beam. The laser beam radiated from the laser light unit passes through the scanner split and the glass plate 24 and exposes a photosensitive peripheral surface of a photosensitive drum 23 to be described later.

The process unit 3 is provided for forming a toner image on a surface of the recording sheet S supplied from the resister rollers 13, 14. As shown in FIG. 3, the process unit 3 includes the photosensitive drum 23, a transfer roller 25, a scorotoron charge unit 26, a developing roller 27, a feed roller 28, a detachable toner cartridge 29, a cleaning roller 30, a discharging lamp 30a, a blade 32, and a case 34. The case 34 is made from a compound resin and stores the other components. The photosensitive drum 23 extends in a direction parallel with the scanner port, that is, perpendicular to the sheet surface of FIG. 3, and has the photosensitive peripheral surface. The charge unit 26 is disposed beneath the photosensitive drum 23 for developing a uniform charge on the photosensitive peripheral surface of the photosensitive drum 23. The transfer roller 25 is disposed above the photosensitive drum 23 in contact therewith. Recording sheets S supplied from the sheet supply unit 5 are transported between the photosensitive drum 23 and the transfer roller 25. The transfer roller 25 is applied with a bias opposite the bias of the photosensitive drum 23 so that an electrical field develops therebetween.

The developing roller 27 and the feed roller 28 together serve as a developing unit and are disposed upstream from the photosensitive drum 23 in the sheet feed direction F. The toner cartridge 29 is provided further upstream from the developing roller 27 and the feed roller 28 in the sheet feed direction F. The cleaning roller 30 and the discharging lamp 30a are disposed downstream from the photosensitive drum 23.

The toner cartridge 29 stores toner particles therein (not shown) and includes a agitator 31 for agitating the toner particles and supplying the toner particles to the feed roller 28. Rotation of the feed roller 28 further supplies the toner particles onto the developing roller 27 to form a toner layer on the developing roller 27. Then, the blade 32 regulates the thickness of the toner layer on the developing roller 27 to form a uniform thickness. Rotation of the developing roller 27 transports the toner layer toward the photosensitive drum 23.

The surface of the photosensitive drum 23, which was uniformly charged by the charge unit 26, is exposed to the laser beam from the laser light unit to form thereon an electrostatic latent image corresponding to the original image. Then, toner particles are supplied to the photosensitive drum 23 from the developing roller 27, thereby developing a toner image corresponding to the electrostatic latent image. Rotation of the photosensitive drum 23 transports the toner image toward the transfer roller 25. The toner image is attracted by and travels toward the transfer roller 25 due to the electric field generated between the photosensitive drum 23 and the transfer roller 25, and so impinges in the recording sheet S disposed between the transfer roller 25 and photosensitive drum 23.

Toner particles not transferred onto the recording sheet S are further transported by the rotation of the photosensitive drum 23 to be collected by the cleaning roller 30. Afterward, the collected toner particles on the cleaning roller 30 are returned to the photosensitive drum 23 at a predetermined timing and collected by the developing roller 27.

The fixing unit 4 is provided for fixing the toner image onto the recording sheet S. The fixing unit 4 includes a heat roller 15, a pressing roller 16, and a pair of discharge rollers 17, 18. The heat roller 15 includes a fixing heater 15a for generating heat and an aluminum tube 15b for housing the fixing heater 15a. A halogen lamp is used as the fixing heater 15a in the present embodiments. The aluminum tube 15b has a peripheral surface coated with fluorine. The pressing roller 16 is a rubber roller having a peripheral surface covered with fluorocarbon resin. The pressing roller 16 is urged against the fixing roller 15, thereby developing a nip portion between the pressing roller 16 and the fixing roller 15. When the recording sheet S with the toner image reaches the fixing unit 4, rotation of the pressing roller 16 and the fixing roller 15 draws the recording sheet S between the pressing roller 16 and the fixing roller 15 while the recording sheet S is interposed at the nip portion. Heat generated by the heat roller 15 is applied to the recording sheet S to fix the toner image onto the recording sheet S. The recording sheet S is then picked up by the discharge rollers 17, 18 and discharged out of the case 1 onto the discharge tray 8.

As shown in FIG. 3, an accommodating portion 36 is defined below the front side portion of the main frame 1a attached to the main cover 1b for accommodating a cooling fan 35. Also, an air duct 37 is defined by a plate 37a between the process unit 3 and the fixing unit 4. The air duct 37 is connected with the accommodating portion 36 and extends in a direction orthogonal to the sheet feed direction F. The plate 37a includes a front side wall and a rear side wall for preventing heat generated by the heat roller 15 from directly conducting to the process unit 3. The plate 37a has an inverted-V-shaped cross-sectional area when viewed from the side. The rear side wall of the plate 37a is formed with a plurality of slits (not shown). Also, as shown in FIG. 2, the top cover 7 is formed with a plurality of vents 40.

The cooling fan 35 is provided for generating a cooling air current. The cooling air current flows through the air duct 37 and through the slits in the rear side wall of the pate 37a along the main frame 1a until it reaches to and cools off a power section 39, which is provided in the back portion of the case 1, and the main motor 84 of the drive system unit 6. The cooling air current generated by the cooling fan 35 also flows through the slits of the plate 37a, through a space defined between the process unit 3 and fixing unit 4, and through the vents 40, and is expelled out of the case 1.

It should be noted that the sheet supply roller 11, the register rollers 13, 14, and the photosensitive drum 23 form a sheet supply transporting mechanism of the laser printer 100, and that the heat roller 15, the pressing roller 16, the discharge roller 17, and the pinch roller 18 forms a sheet discharge transporting mechanism. Both the sheet supply transporting mechanism and the sheet discharge transporting mechanism are driven by the main motor 84.

The laser printer 100 further includes a control unit 70. Although not shown in the drawings, the control unit 70 is disposed in the right side portion within the main frame 1a. As shown in FIG. 4, the control unit 70 includes a central processing unit (CPU) 71. The control unit 70 also includes a read only memory (ROM) 72, a random access memory (RAM) 73, a timing circuit (TC) 74, an interface (I/F) 75, a video interface (V.I/F) 76, a sensor interface (S.I/F) 77, a toner sensor 33, a sheet sensor 51, a thermistor 107, a plurality of other sensors, a panel interface (P.I/F) 78, a timer 79, and a DC controller circuit 82, each connected to the CPU 71 via a bus 81.

The ROM 72 stores various control programs. The RAM 73 includes various temporary memories, such as a reception buffer for storing data received from an external computer, such as a personal computer and a host computer. The timing circuit 74 generates timing signals indicating time to read data from and/or to store data into the reception buffer. The interface 75 receives data from the external data transmitting device. The video interface 76 includes a scanner buffer (not shown) and outputs bit print data in a sequence to the DC controller circuit 82. The sensor interface 77 is connected to the toner sensor 33, the sheet sensor 51, the thermistor 107, and the other sensors so as to receive detection signals from these sensors. The panel interface 78 receives signals from the control panel 1c.

The toner sensor 33 detects remaining amount of toner particles within the toner cartridge 29. As shown in FIG. 3, the toner sensor 33 is positioned so as to protrude upward from the support plate 2a. Although not shown in the drawings, the toner sensor 33 includes a light emission unit and a light reception unit facing each other. The toner cartridge 29 is formed with grooves at its lower surface for receiving the light emission unit and the light reception unit of the toner sensor 33.

The sheet sensor 51 is provided on the downstream side of the feed roller 11 for detecting paper sheets S stored in the sheet supply unit 5. The thermistor 107 for detecting temperature of the heat roller 15 is attached to an outer surface of the heat roller 15, substantially at the lengthwise center of the heat roller 15. It should be noted that although the temperature at the outer surface of the heat roller 15 is detected, this temperature is considered as the temperature of the fixing heater 15a in the present embodiments.

The DC controller circuit 82 is connected to drive circuits 87, 89, 91, 91, and a high-voltage substrate 92. The drive circuits 87, 89, 91, 91 are further connected to the main motor 84, the laser diode 85, a scanner motor 86 for driving the polygon mirror 20, and the fixing hater 15a, respectively. The substrate 92 generates a high-voltage electric field to the photosensitive drum 23, the transfer roller 25, the charge unit 26, the developing roller 27, and the cleaning roller 30, and also lights up the discharging lamp 30a.

The ROM 72 stores various control programs and memory management programs. The memory management programs are for managing memory sizes and starting addresses of various memories, such as a font memory storing dot pattern print data of characters including letters and symbols, and a. reception data buffer and a print image memory provided in the RAM 73.

The laser printer 100 is selectively set in an image forming mode, a waiting mode, and a sleep mode by the CPU 71 based on an output signal from the operation panel 1c and a state of the process unit 3. Printing operations for forming an image on the recording sheet are performed when the laser printer 100 is in the image forming mode. When the laser printer 100 is in the image forming mode, the fixing heater 15a is kept at a predetermined image forming temperature between predetermined temperatures ta1 and tb1 shown in FIG. 7. The image forming temperature is a temperature necessary for the toner image to be fixed onto the recording medium. Because the printing operations are not performed while the laser printer 100 is in the waiting mode, during the waiting mode the temperature of the fixing heater 15a is kept at a predetermined waiting temperature which is lower than the image forming temperature. When the laser printer 100 is in the sleep mode, the driving circuits 87 to 91 and the high-pressure substrate 92 are OFF although a low voltage power source 105 (FIG. 5) is ON so that the CPU 71 can receive a signal from the operation panel 1c.

Next, a mode switching routine executed by the CPU 71 for switching between various modes of the laser printer 100 will be described while referring to the flowchart shown in FIG. 6. The mode switching routine is an interrupting routine which is automatically executed at regular intervals. A program for executing the mode switching routine is stored in the ROM 72.

Figure 5:
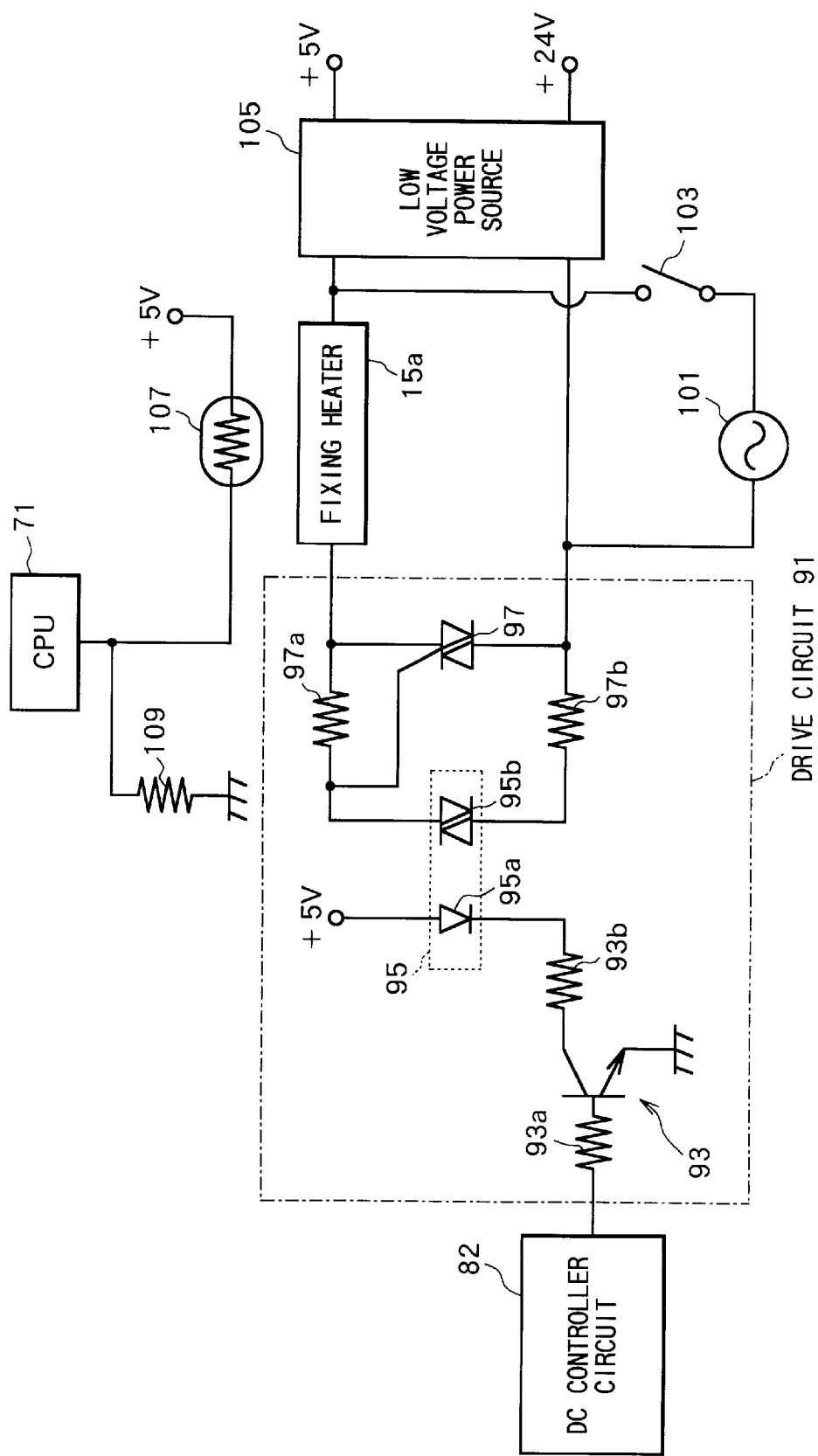
FIG. 5 is a circuit diagram showing electric configuration for controlling temperature of the fixing unit according to the first embodiment of the present invention.

As shown in FIG. 5, after the laser printer 100 is turned ON, the laser printer 100 is set to the waiting mode in SI. Next, in S2, the timer 79 starts measuring a predetermined time duration. Then, it is determined in S3 whether or not any data has been received. If not (S3:NO), it is determined in S4 whether or not the operation panel Ic has been operated. If not (S4:NO), it is determined in S5 whether or not the predetermined time duration has elapsed. If not (S5:NO), the program returns to S3. On the other hand, if S5 results in an affirmative determination (S5:YES), the laser printer 100 is set to the sleep mode, and then, the program returns to S3. That is, the laser printer 100 is set to the waiting mode when turned ON. Then, if no data is received and if the operation panel 1c is not operated for the predetermined time duration, the laser printer 100 is switched to the sleep mode.

If it is determined in S3 that data has been received (S3:YES), or in S4 that the operation panel 1c has been operated (S4:YES), the program proceeds to S7 wherein the laser printer 100 is switched into the image forming mode and printing operations are performed. Then, it is determined in S8 whether or not the printing operations have been completed. If not, the laser printer is maintained in the image forming mode until S8 results in an affirmative determination. If it is determined in S8 that the printing operations have been completed (S8:YES), then the program returns to S1.

Figure 6:
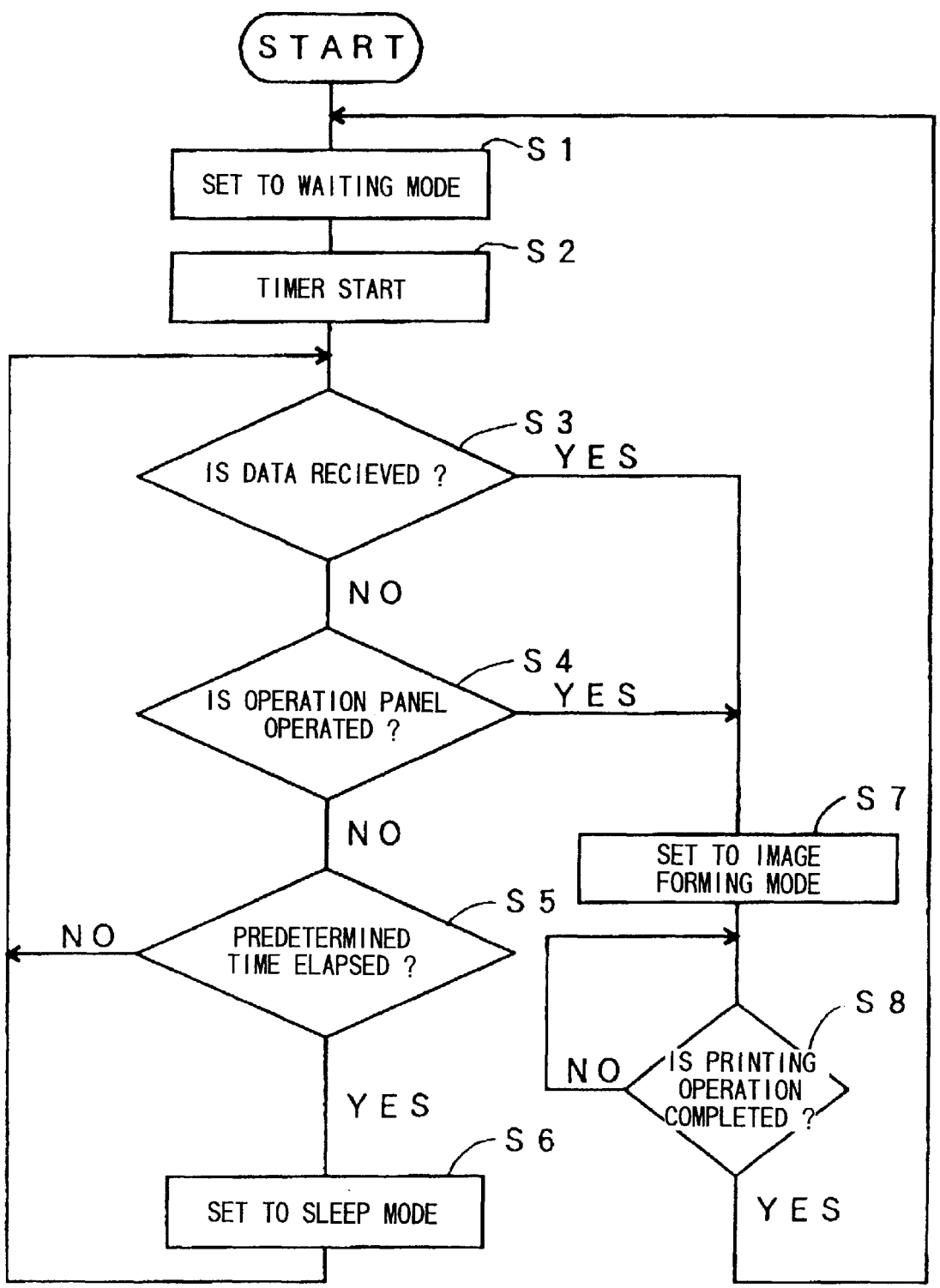
FIG. 6 is a flowchart representing a mode switching routine of the laser printer of FIG. 2.

Next, detailed descriptions for the drive circuit 91 and its surrounding components will be provided with reference to FIG. 6.

As shown in FIG. 6, the drive circuit 91 includes a transistor 93, a photo-TRIAC-coupler 95, a TRIAC 97, and resistors 93a, 93b, 97a, 97b. The DC controller circuit 82 is connected to the base of the transistor 93 via the resistor 93a so that the CPU 70 can control ON and OFF condition of the transistor 93. The photo-TRIAC-coupler 95 includes a light emitting diode 95a and a TRIAC 95b. The light emitting diode 95a is connected to the collector of the transistor 93 via the resistor 93b. Each terminal of the TRIAC 97 is connected to a corresponding terminal of the TRIAC 95b of the photo-TRIAC-coupler 95 via one of the resistor 97a and the resistor 97b. A gate of the TRIAC 97 is connected to a node between the resistor 97a and the TRIAC 95b. With this configuration, a voltage drop across the resistor 97a triggers the TRIAC 95b.

A commercial AC 100-V power source 101, a power switch 103, and the fixing heater 15a are connected in series between the terminals of the TRIAC 97. Further, the low-voltage power source 105 is connected between the fixing heater 15a and the power switch 103 and between the power switch 101 and the TRIAC 97. The power source 105 selectively outputs a 5V DC voltage and a 24V DC voltage.

The thermistor 107 is disposed near the fixing heater 15a, specifically on the surface of the heat roller as described above, for detecting temperature of the fixing heater 15a. One terminal of the thermistor 107 is grounded via a resistor 109 and an another terminal is connected to a DC power source supplying a voltage of 5V. The CPU 71 is connected between the thermistor 107 and the resistor 109 via an A/D converter (not shown) so as to detect a voltage developed across the resistor 109. The resistance of the thermistor 107 changes with its temperature, that is, the thermistor 107 has a low resistance value at a low temperature and has a high resistance value at a high temperature. Therefore, the CPU 71 can detect the temperature of the fixing heater 15a by detecting the voltage developed across the resistor 109. Then, according to the detected temperature, the CPU 71 controls the ON and OFF condition of the transistor 93 via the DC controller circuit 82

When the transistor 93 is turned ON while the power switch 103 is ON, the photo-TRIAC-coupler 95 is rendered ON, thereby supplying an electric current to the resistor 97a. As a result, the TRIAC 97 is rendered ON and an electric current (lamp current) is supplied to the fixing heater 15a. That is, the ON/OFF toggling of the TRIAC 97 conforms to the ON/OFF toggling of the transistor 93. In other words, application of the lamp current to the fixing heater 15a is controlled by controlling ON/OFF condition of the transistor 93. Because the TRIAC 97 is turned OFF at a zero-cross point, the TRIAC 97 is turned OFF with a delay of at most a half a period of the alternating current with respect of a timing at which the transistor 93 is OFF. If the photo-TRIAC-coupler 95 is provided with a zero-cross point detecting function, the TRIAC 97 is turned ON a maximum of half a period of the power source frequency after the transistor 93 is turned ON.

Next, an operation of the CPU 71 for controlling the temperature of the fixing heater 15a when the laser printer 100 is in the image forming mode will be described while referring to FIG. 7. As described above, in the present embodiments, the temperature of the region near the fixing heater 15a is detected and controlled as the temperature of the fixing heater 15a.

Figure 7:
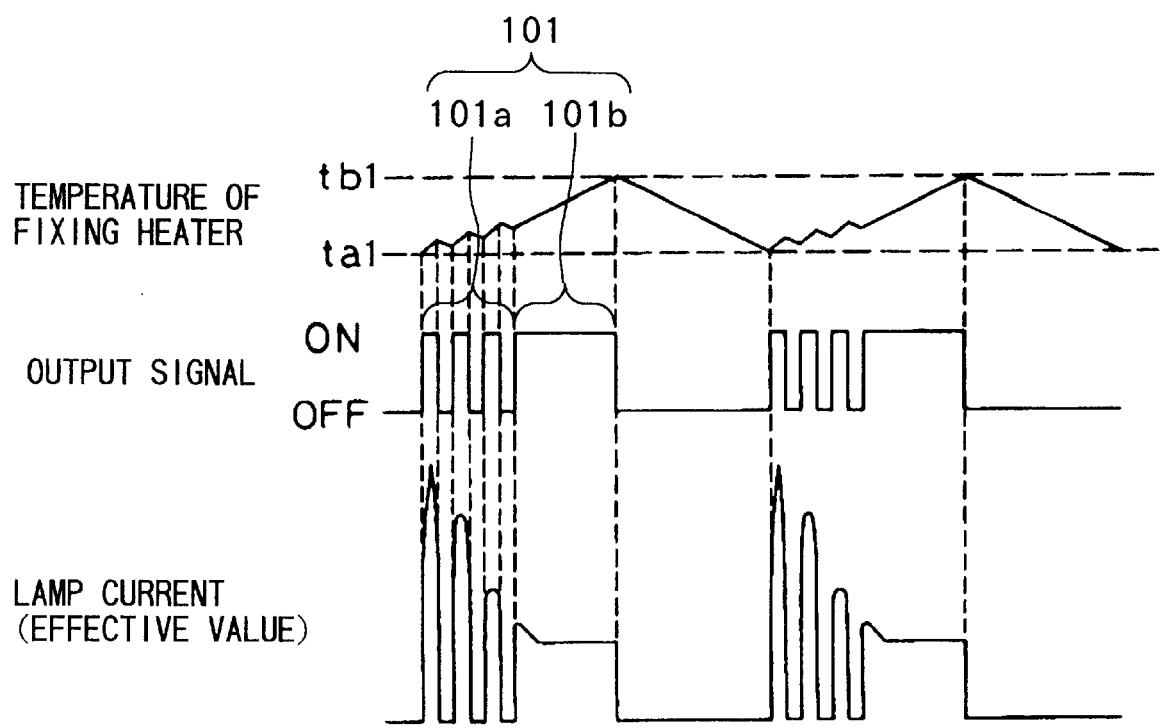
FIG. 7 is a time chart showing electrical control of the fixing unit according to the first embodiment.

As shown in FIG. 7, the CPU 71 controls the fixing heater 15a to be at the image forming temperature between the temperatures ta1 and tb1 when the laser printer 100 is in the image forming mode. When the temperature of the fixing heater 15a drops to the temperature ta1, the transistor 93 is turned ON so that a lamp current is supplied to the fixing heater 15a. When the fixing heater 15a is supplied with the lamp current, the fixing heater 15a generates heat, and its temperature increases. When the temperature of the fixing heater 15a reaches the temperature tb1, the transistor 93 is turned OFF, thereby stopping supplying the lamp current to the fixing heater 15a. As a result, the fixing heater 15a stops generating heat, and its temperature starts decreasing. Then, when the temperature of the fixing heater 15a drops to the temperature ta1, the transistor 93 is again turned ON.

In order to turn ON and OFF the transistor 93, the CPU 71 controls the DC controller circuit 83 to output a signal 101 to the transistor 93. The signal 101 includes a pulse portion 101a and a continuous portion 101b. As described above, usually, a rush current is generated when a lamp current is first supplied to the fixing heater 15a, resulting in flicker in lighting. However, because the DC controller circuit 83 outputs the signal 101 with the pulse portion 101a, the rush current is controlled and flicker can be prevented.

Specifically, the lamp current is supplied to the fixing heater 15a in accordance with ON/OFF of the transistor 93. Because the transistor 93 is intermittently turned ON by the pulse portion 101a of the output signal 101 at the beginning of the application of the lamp current, the rush current is intermittently disrupted accordingly. This increases a frequency of the voltage drop caused in relation with the rush current. As a result, change of the lighting in its brightness occurs at a high frequency, which is less noticeable to people. In this way, generation of flicker can be satisfactorily controlled.

In this embodiment, a frequency of the power source 105 is 50 Hz, the pulse portion 101a includes three pulses each having a high level duration of (ON time duration) approximately 10 msec and a low level duration (OFF time duration) of approximately 20 msec. That is, the pulse portion 101a has a total amount of the high level durations is about 90 msec.

The pulse portion 101a is followed by the continuous portion 101b. That is, after about 90 msec, the lamp current is continuously supplied to the fixing heater 15a. Because the rush current is generated for only short about 90 msec at the beginning of the application of the lamp current, continuous application of the lamp current after 90 msec will not cause the lighting to flicker.

It should be noted that the application of pulses generates noise. However, because the output signal 101 includes the pulse portion 101a with the duration as short as 90 msec, which is a minimum required width for controlling the occurrence of flicker, the noise due to the pulses is minimized. Also, because the fixing heater 15a is supplied with the lamp current continuously after 90 msec, the fixing heater can increase its temperature rapidly and efficiently. Further, because the CPU 71 controls the lamp current supplied to the fixing heater 15a based on the temperature detected by the thermistor 107, the temperature of the fixing heater 15a can be reliably and precisely controlled.

It should be noted that the pulse portion 101a can include a different number of pulses with a different high level duration and a different low level duration.

Not only in the image forming mode, but also in the waiting mode, the temperature of the fixing unit 15a can be controlled in the same manner as described above. In this case, the CPU 71 detects, based on the states of the process unit 3, whether the laser printer 100 is in the image forming mode or in the waiting mode. Then, the CPU 71 controls the fixing heater 15a to maintain the image forming temperature during the image forming mode and to maintain the waiting temperature during the waiting mode. Because the fixing heater 15a requires total lamp current amount different in the image forming mode than in the waiting mode, the operation for controlling the rush current is also different in the image forming mode from the waiting mode. Therefore, it is preferable that the CPU 71 control the fixing heater 15a in different manners in the image forming mode and in the waiting mode so that flicker can be prevented both in the image forming mode and the waiting mode. For example, at least one of the number of pulse, the high level duration of each pulse, and the low level duration of each pulse can be adjusted based on whether it is in the image forming mode or in the waiting mode.

Next, methods for controlling the ON and OFF condition of the transistor 93 at timing t1 and timing t2 will be described while referring to FIGS. 8(a) to 8(e). It should be noted that, at timing tl, the laser printer 100 is turned ON and set to the waiting mode or is set to the image forming mode from the sleep mode, and that, at timing t2, the laser printer is set to the image forming mode from the waiting mode.

Figure 8:
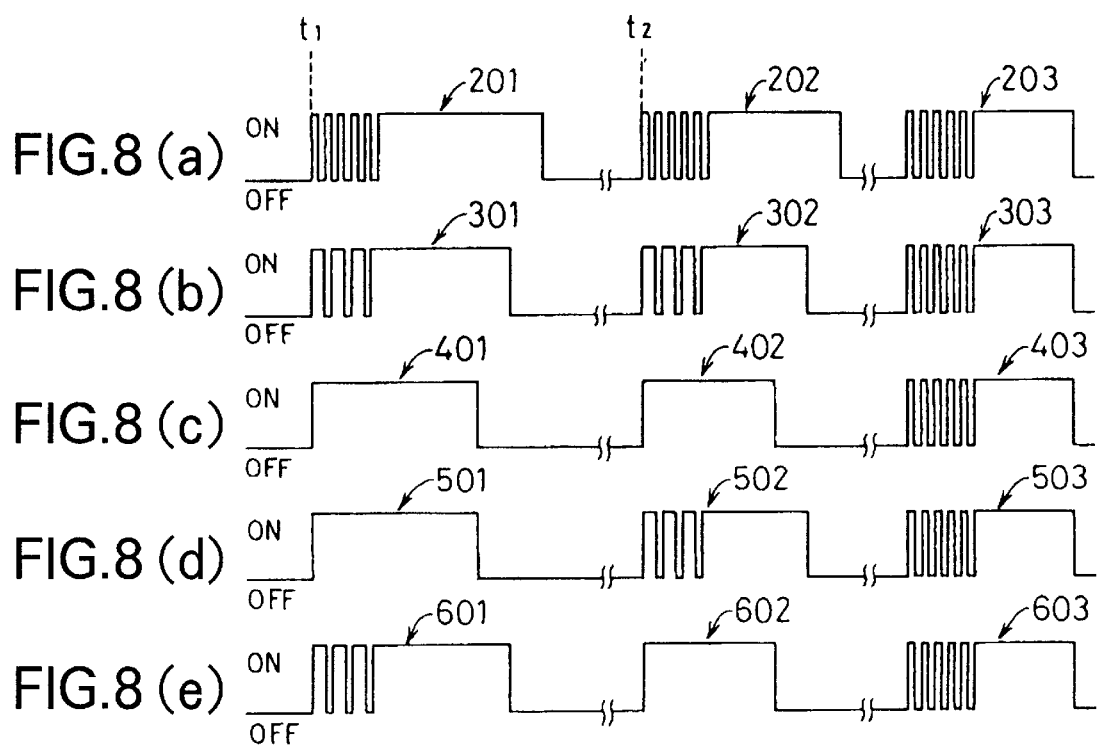
FIG. 8(a) is a time chart showing signals applied to a transistor according to a first example of the first embodiment.
FIG. 8(b) is a time chart showing signals applied to the transistor according to a second example of the first embodiment.
FIG. 8(c) is a time chart showing signals applied to the transistor according to a third example of the first embodiment.
FIG. 8(d) is a time chart showing signals applied to the transistor according to a forth example of the first embodiment.
FIG. 8(e) is a time chart showing signals applied to the transistor according to a fifth example of the first embodiment.

FIG. 8(a) shows output signals 201, 202, 203, each having a high frequency pulse portion. In this example, the output signals are output to the transistor 93 at timings t1, t2, respectively, and the output signal 203 during the image forming mode. However, application of the output signals 201, 202 with this waveform at timing t1, t2 has some drawbacks.

Specifically, the fixing heater 15a needs to increase its temperature in a great amount at timings t1 and t2. This requires a relatively large amount of lamp current. That is, when the laser printer 100 is OFF or is in the sleep mode, the temperature of the fixing heater 15a can be as low as room temperature. When the laser printer 100 is turned ON and set to the waiting mode at timing t1 or when the laser printer 100 is set to the image forming mode from the sleep mode at timing t1, the temperature of the fixing heater 15a needs to be greatly increased from room temperature to either the waiting temperature or the image forming temperature. Also, when the laser printer 100 is switched to the image forming mode from the waiting mode at timing t2, the temperature of the fixing heater 15a needs to greatly increase to the image forming temperature.

However, when the lamp current is intermittently disrupted by the pulse portions of the output signals 201, 202, 203, increase in temperature of the fixing heater 15a is slow and insufficient. Therefore, the fixing heater 15a takes a relatively long time to reach a target temperature, that is, either the image forming temperature or the waiting temperature. Because printing operations can not be performed until the fixing heater 15a reaches the image forming temperature, the user must impatiently wait if the fixing heater 15a takes a long time to reach the image forming temperature.

In order to solve these problems, as shown in FIG. 8(b), output signals 301, 302, 303 are output to the transistor 93 at timings t1, t2, and during the image forming mode, respectively. The output signal 303 is identical to the output signal 203. The output signals 301, 302 include pulse portions with fewer pulses each having a longer high level duration than that of the output signal 303. That is, each pulse of the output signal 301, 302 has a greater high level duration than that of the output signals, 201, 202. Also, the low level duration of each pulse of the output signal, 301, 302 is shorter than that of the output signals 201, 202. In other words, the total amount of the time that the pulse portions of each output signal 301, 302 having the high level (hereinafter referred to as "total ON time") is longer and the total amount of the time that the pulse portions having the low level (hereinafter referred to as "total OFF time") is shorter than that of the output signal 303. Because the lamp current is supplied to the fixing heater 15a when the output signal is ON, the amount of the lamp current supplied to the fixing heater 15a increases in proportion to increase in the total ON time. Therefore, the fixing heater 15a can increase its temperature efficiently by using the output signals 301, 302 at timings t1 and t2, respectively. Therefore, even when the fixing heater 15a is at a low temperature because the laser printer 100 is OFF or because the laser printer 100 is in the sleep mode, the fixing heater 15a can increase its temperature rapidly and efficiently to either the waiting temperature or the image forming temperature after timing t1. Also, the fixing heater 15a can rapidly increase its temperature to the image forming temperature when the laser printer 100 is switched to the image forming mode at timing t2. Further, because both the output signals 301, 302 include the pulse portions, the occurrence of flicker due to rush currents can also be prevented. Moreover, because it is unnecessary for the fixing heater 15a to drastically increase its temperature once the fixing heater 15a reaches the image forming temperature, the output signal 303 with more and shorter pulses can be output to the transistor 93 during the image forming mode. In this way, the fixing heater 15a is maintained at the image forming temperature while rush current is preferably and reliably prevented.

Alternatively, as shown in FIG. 8(c), output signals 401, 402 without pulse portions can be output at timings t1 and t2, respectively. In this way, the temperature of the fixing heater 15a can be further rapidly and efficiently increased. Therefore, the waiting time can be further shortened. Then, output signal 403, which has a waveform identical to that of the output signal 203, can be output during the image forming mode to control rush currents.

Also, as shown in FIG. 8(d), an output signal 501 with no pulse portion can be output at timing t1, and an output signal 502 with fewer pulses with a greater high level duration can be output at timing t2. Because the fixing heater 15a is completely cooled down when the laser printer 100 is OFF or when in the image forming mode, it requires a great amount of lamp current for the fixing heater 15a to reach either the waiting temperature of the image forming temperature directly after timing t1. Therefore, application of the output signal 501 with no portion can shorten the waiting time. The output signal 502 is identical to the output signals 301, 302, that is, a pulse portion of the output signal 502 has a relatively long total ON time duration and short total OFF time duration. Therefore, the fixing heater 15a can increase its temperature efficiently while the rush current is controlled. Then, an output signal 403 identical to the output signal 203 can be output during the image forming mode so as to control the rush current.

Further, as shown in FIG. 8(e), an output signal 601 with fewer longer pulses can be output at timing t1, and an output signal 602 with no pulse portion can be output at timing t2. The fixing heater 15a has a lower resistance value when cool than when heated up. Accordingly, a greater rush current will occur when the fixing heater 15a is cool than when heated up. Therefore, flicker most likely occurs when the laser printer 100 is first turned ON at timing t1 or switched to the image forming mode from the sleep mode. However, flicker can be prevented even at timing t1 by controlling the transistor 93 using the output signal 601 which is identical to the output signal 301. Because the temperature of the fixing heater 15a is higher during the waiting mode than when the laser printer 100 is OFF or in the sleep mode, flicker is less likely to occur at timing t2 than timing t1. Therefore, the output signal 602 with no pulse portion can be output at timing t2 to rapidly and efficiently increase temperature of the fixing heater 15a. Then, an output signal 603 which is identical to the output signal 203 can be output during the image forming mode so as to control the rush current.

It should be noted that, in the above described embodiment, the output signals 301, 302, 502, 601 which have the pulses with relatively greater high level duration are used. However, alternatively, an output signal having pulses with relatively shorter low level duration can be used. In this way, the total ON time duration can be increased without changing the high level of the pulses of the output signal.

Next, an operation for controlling the temperature of the fixing heater 15a according to a second embodiment will be described.

In the above-described first embodiment, when the laser printer 100 is in the image forming mode, the CPU 71 controls the fixing heater 15a to be at the image forming temperature between temperature ta1 to temperature tb1 by turning ON and OFF the transistor 93. Also, when the laser printer 100 is in the waiting mode, the CPU 71 controls the fixing heater 15a to be at the waiting temperature. Usually, the laser printer 100 is kept in the waiting mode for a longer time than in the image forming mode. Therefore, more precise prevention of the flicker is needed in the waiting mode than in the image forming mode. In order to achieve this objective, as shown in FIG. 10, the image forming temperature is set to between temperature ta2 and temperature tb2, and the waiting temperature is set to between temperatures ta3 and tb3 so that the difference between the temperatures ta3 and tb3 is greater than the difference between the temperatures ta2 and tb2. Detailed descriptions will be provided next while referring to FIGS. 9 and 10.

Figure 9:
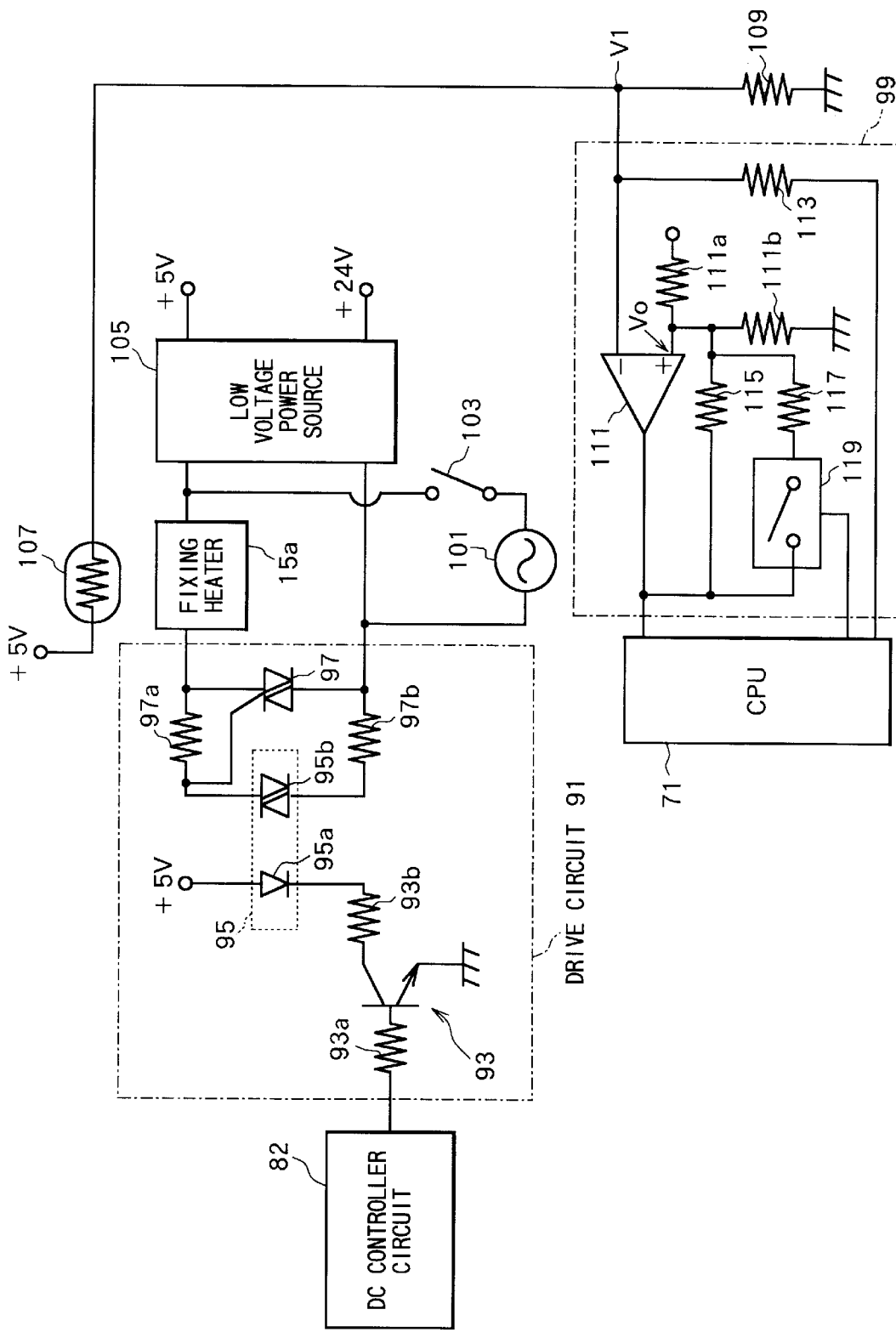
FIG. 9 is a circuit diagram showing electric configuration for controlling temperature of a fixing heater according to the second embodiment of the present invention.
Figure 10:
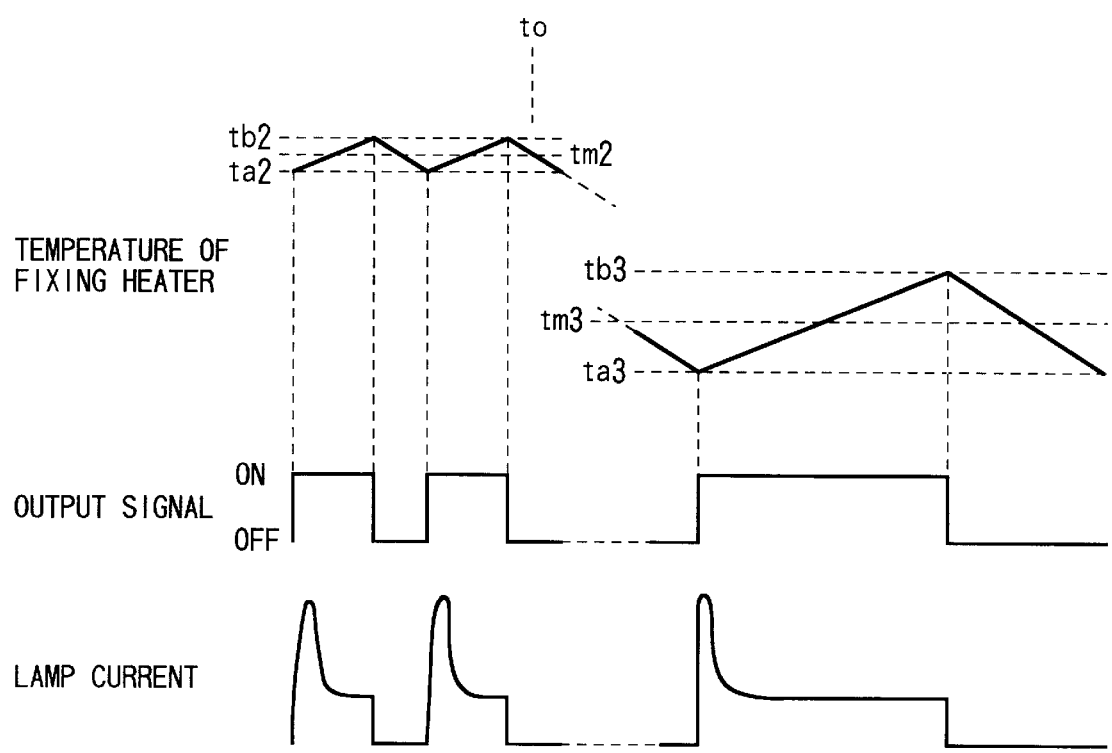
FIG. 10 is a time chart showing electrical control according to the second embodiment of the present invention.

As shown in FIG. 9, the DC controller circuit 82, the driver circuit 91, the fixing heater 15a, and the surrounding components according to the present embodiment are the same as in the first embodiment shown in FIG. 5 except that an additional control circuit 99 is connected between the thermistor 107 and the resistor 109 and to the CPU 71.

The control circuit 99 includes an operation amplifier 111, resistors 111a, 111b, 115, 117, and an analog switch 109. A voltage V1 between the thermistor 107 and the resistor 109 is input into an inverted input terminal of the operation amplifier 111 and also to the CPU 71 via the resistor 113 and an A/D converter (not shown). The resistor 111a provides a reference voltage V0 to a non-inverted input terminal of the operation amplifier 111. The non-inverted input terminal is grounded via the resistor 111b and also connected to a positive feed back circuit. Specifically, the non-inverted input terminal is connected to a parallel circuit of the resistor 115 and a serial circuit including the resistor 117 and the analog switch 119. Output of the operation amplifier 111 is converted into binary data via a well known circuit (not shown) and input into the CPU 71. The resistors 111a, 111b have a resistance value of 1KΩ, and the resistors 115, 117 have a resistance value of 100KΩ, in this embodiment.

The CPU 71 controls ON/OFF of the analog switch 119 based on data received via the bus 81 (FIG. 3). The CPU 71 also controls ON/OFF condition of the transistor 93 via the DC controller circuit 82.

The thermistor 107 has a low resistance value at low temperatures. Right after the power switch 103 of the laser printer 100 is turned ON, the voltage drop at the thermistor 107 is a small amount. Therefore, a relatively high voltage V1 is input into the inverted input terminal of the operation amplifier 111. At this time, the output of the operation amplifier 111 is low. As the fixing heater 15a increases in its temperature, the resistance value of the thermistor 107 also increases, and the voltage V1 decreases accordingly. When the voltage V1 becomes lower than the voltage V0, which is input into the non-inverted input terminal, the output of the operation amplifier 111 is inverted to a high level. At this time, the positive feedback circuit of the operational amplifier 11 stabilizes the output of the operation amplifier 111. Then, when the voltage V1 exceeds the voltage V0 as the temperature of the thermistor 107, that is, the temperature of the fixing heater 15a, increases, the operation amplifier 111 switches to output a low level signal.

When the operation amplifier 111 outputs a low level signal, the CPU 71 controls the transistor 93 to be ON via the DC controller circuit 82. On the other hand, when the operation amplifier 111 outputs a high level signal, the CPU 71 controls the transistor 93 to be OFF.

As shown in FIG. 10, the image forming temperature and the waiting temperature have mid point temperatures tm2, tm3, respectively, which are determined by the value of the reference voltage V0. Therefore, the fixing heater 15a can be maintained at either the image forming temperature or the waiting temperature by adjusting the value of the reference voltage V0. Specifically, the value of the reference voltage V0 is set smaller in the waiting mode than in the image forming mode so that the temperature tm3 will be lower than the temperature tm2. It should be noted that the value of the reference voltage V0 is adjusted so that the temperature tb3 will be lower than the temperature ta2 in this embodiment.

Also, the differences between the temperatures ta2 and tb2 and between the temperatures ta3 and tb3 are determined by a total resistance value of the positive feed back circuit. That is, when the analog switch 119 is ON, the difference between temperatures will be large, and when the analog switch 119 is OFF, the difference will be small. Therefore, the difference between the temperatures ta3 and tb3 can be set greater than that of the temperatures ta2 and tb2 by selectively switching ON and OFF the analog switch 119.

In this way, the fixing heater 15a can be selectively maintained at the image forming temperature and the waiting temperature.

Next, operations for controlling the temperature of the fixing heater 15a will be described while referring to the time chart shown in FIG. 10. In the image forming mode, when the temperature of the fixing heater 15a drops to the temperature ta2, the transistor 93 is turned ON, thereby a lamp current being supplied to the fixing heater 15a. The fixing heater 15a starts generating heat and increases its temperature. When the temperature of the fixing heater 15a reaches the temperature tb2, the transistor 93 is turned OFF, so that supply of the lamp current to the fixing heater 15a is stopped. The temperature of the fixing heater 15a starts decreasing toward the temperature ta2, and the above processes are repeated during the image forming mode.

In the waiting mode, the temperature of the fixing heater 15a is controlled at the waiting temperature between the temperatures ta3 and tb3 in the same manner as described above. However, the transistor 93 is turned ON when the temperature of the fixing heater 15a drops to the temperature ta3, and is turned OFF when the temperature reaches the temperature tb3.

Because the difference between the temperatures ta3 and tb3 is greater than that between the temperatures ta2 and tb2, the transistor 93 is turned ON and OFF less frequently in the waiting mode than in the image forming mode. Therefore, flicker will occur less frequently. In this way, the occurrence of the flicker can be controlled. Also, because the temperature tb3 is set lower than the temperature ta2, the laser printer 100 will consume less electricity in the waiting mode can be reduced.

It should be noted that the temperature tb3 can be set between the temperature ta2 and tb2 rather than lower than the temperature ta2. In this case, when the laser printer 100' is switched from the image forming mode to the waiting mode, the fixing heater 15a can be quickly heated up to the image forming temperature. This shortens the waiting time. Also, because the temperature tb3 is lower than the temperature tb2, the laser printer 100 in the waiting mode can be controlled to consume less electricity.

Even if the temperature tb3 is set greater than the temperature tb2, if the difference between the temperatures ta3 and tb3 is greater than that between the temperatures ta2 and tb2, occurrence of flicker can be controlled.

Although, in the above described embodiment, the CPU 71 controls ON and OFF condition of the transistor 93 based on output from the operation amplifier 111, the same control can be achieved using a program software. In this case, the voltage V1 is converted to digital data and input into the CPU 71. Then, the software program can be executed based on the digital data. Also, the temperature of the fixing heater 15a can be detected by calculating an impedance of the fixing heater 15a.

In the above-described second embodiment, the difference between the temperatures ta3 and tb3 is set greater than that between the temperatures ta2 and tb2 so that the transistor 93 will be turned ON and OFF less frequently during the waiting mode. However, a smaller voltage can be applied to the fixing heater 15a in the waiting mode than in the image forming mode. In this way, the increasing rate of the fixing heater 15a is slowed in the waiting mode. Therefore, without varying the difference between the temperatures ta3 and tb3 from the difference between the temperatures ta2 and tb2, the transistor 93 need not be turned ON and OFF as frequently.

In order to further effectively control flicker, the transistor 93 can be controlled turned ON and OFF in the process described in the first embodiment. That is, the transistor 93 can be controlled by using the output signals 201 to 203, 303 to 303, 401 to 403, 501 to 503, or 601 to 603 shown in FIGS. 8(A) to 8(E), respectively.

It should be noted that the generation of flicker varies with the voltage, frequency, and the like of the power source, with the indoor wiring conditions, and the like. Also, the flicker tolerance may vary according to the regulations of different countries. Therefore, it is necessary to change a control method of electrical supply in accordance with the regulations and the kind of the power source. For this reason, it is desirable to store such different methods for controlling electrical supply in a memory, such as an NVRAM. In this way, the method of electrical supply can be overwritten by or replaced with the suitable one as needed. Accordingly, flicker can be controlled in different countries or under different conditions.

While the invention has been described in detail with reference to specific embodiments thereof, it would be apparent to those skilled in the art that many modifications and variations may be made therein without departing from the spirit of the invention, the scope of which is defined by the attached claims.

For example, in the embodiments described above, the temperature near the fixing heater 15a is detected using the thermistor 107. However, the temperature of the fixing heater 15a itself can be detected by calculating an impedance of the fixing heater 15a.

Also, in the embodiments described above, the fixing roller 15 includes the halogen lamp as the fixing heater 15a. However, the fixing heater 15a can be formed from other various kinds of members that generate heat. However, it should be noted that a relatively large rush current is generated in a lamp current supplied to a lamp, such as the halogen lamp of the above-described embodiments. Therefore, flicker control is a particularly important issue in such cases. Since the present invention is applied in the fixing roller 15 including the halogen lamp, the effects of this invention are most striking.

Although the fixing roller 15 of the present invention is used in the laser printer 100 in the above-described embodiments, the fixing roller 15 can be used in different kinds of image forming devices, such as copy machines. Further, after the laser printer 100 is turned ON, the temperature of the fixing heater 15a can be, first increased to the image forming temperature and, then, maintained at the waiting temperature. In this case, the temperature of the fixing roller 15a is further greatly increased with the laser printers 100, 100 are first turned ON.

What is claimed is:

1. An electrical equipment comprising:
a power source;
a switching unit that is selectively turned ON and OFF;
A driven unit connected to the power source via the switching unit;
a detecting unit that is coupled to the driven unit and detects a status of the driven unit and outputs a status signal indicative of the status of the driven unit; and
a control unit that outputs a drive signal based on the status signal, the drive first signal having a first portion, wherein the power source supplies an electric current to the driven unit when the switching unit is ON, wherein the switching unit is intermittently turned ON and OFF in accordance with the first portion of the drive signal, resulting in intermittently disrupting the electric current as a rush current generated immediately after the control unit begins outputting the drive signal, and said disrupting the electrical current is repeated each time the control unit begins outputting the drive signal.

2. The electrical equipment according to claim 1, wherein the drive signal has a second portion following the first portion, and the switching unit is continuously maintained ON in accordance with the second portion of the drive signal, resulting in continuously supplying the driven unit with the electric current as a normal current having a normal current value, and the rush current has a rush current value larger than the normal current value.

3. An electrical equipment comprising:
a heating unit that generates heat;
a temperature detecting unit that detects a temperature of the heating unit;
a control unit that outputs a first signal based on the temperature detected by the temperature detecting unit; and
a switching unit that is selectively turned ON and OFF based on the first signal, the switching unit supplying an electric current to the heating unit when the switching unit is ON, thereby causing the heating unit to generate heat, wherein the switching unit is intermittently tuned ON and OFF in accordance with the first portion of the first signal, resulting in intermittently disrupting the electric current as a rush current generated immediately after the control unit begins outputting the first signal, and said disrupting the electric current is repeated each time the control unit outputs the first portion of the first signal.

4. The electrical equipment according to claim 3, further comprising a mode detecting unit that detects a first mode and a second mode, wherein the control unit further outputs a second signal based on the temperature detected by the temperature detecting unit, the first signal and the second signal being selectively output from the control unit, wherein the control unit outputs the first signal when the mode detecting unit detects the first mode whereas the control unit outputs the second signal when the mode detecting unit detects the second mode.

5. The electrical equipment according to claim 4, wherein the second signal has a first portion and a second portion following the first portion, and wherein the first portion of the first single has a number of pulses each having a high level duration and a low level duration, the first portion of the second signal has a number of pulses each having a high level duration and a low level duration, and at least one of three factors of the first portion of the first signal including (1) the number of pulses, (2) the high level duration, and (3) the low level duration differs from corresponding factors of the first portion of the second signal.

6. The electrical equipment according to claim 5, further comprising a memory that stores data on the first signal and the second signal.

7. The electrical equipment according to claim 3, wherein the heating unit is a lamp.

8. The electrical equipment according to claim 3, further comprising an operational mode setting unit that selectively set an operational mode to a first mode and a second mode, a mode detecting unit that detects the first mode and the second mode, wherein when the mode detecting unit detects the first mode, the control unit outputs the first signal after outputting a third signal having a first portion and a second portion, the first portion of the first signal having a number of pulses each having a high level duration and a low level duration, the first portion of the third signal having a number of pulses each having a high level duration and a low level duration, and wherein a total duration of the high level durations of the pulses of the first portion of the third signal is greater than a total duration of the high level durations of the pulses of the first portion of the first signal.

9. The electrical equipment according to claim 8, wherein when the mode detecting unit detects the second mode, the control unit outputs the first signal after outputting the third signal.

10. The electrical equipment according to claim 9, wherein the heating unit is maintained at a first predetermined temperature when the mode detecting unit detects the first mode, and the heating unit is maintained at a second predetermined temperature lower than the first predetermined temperature when the mode detecting unit detects the second mode.

11. The electrical equipment according to claim 7, wherein when the operational mode setting unit sets the first mode, the control unit starts outputting a fourth signal to turn ON the switching unit and stops outputting the fourth signal to turn OFF the switching unit when the temperature of the heating unit reaches a first predetermined temperature, the control unit starts outputting the first signal to turns ON the switching unit when the temperature of the heating unit drops to a second predetermined temperature lower than the first predetermined temperature from the first predetermined temperature.

12. The electrical equipment according to claim 3, wherein the first signal has a second portion following the first portion, and the switching unit is continuously maintained ON in accordance with the second portion of the first signal, resulting in continuously supplying the heating unit with the electric current as a normal current having a normal current value, and the rush current has a rush current value larger than the normal current value.

13. The electrical equipment according to claim 3, wherein the first portion of the first signal has three high level portions and three low level portions, wherein a duration of each of the high level portions is approximately 10 msec, and a duration of each of the low level portions is approximately 20 msec.

14. The electrical equipment according to claim 3, wherein the control unit controls the temperature of the heating unit to maintain the temperature of the heating unit in a range between a first predetermined temperature and a second predetermined temperature lower than the first predetermined temperature, wherein the switching unit is turned OFF when the temperature detecting unit detects the first predetermined temperature of the heating unit and turned ON when the temperature detecting unit detects the second predetermined temperature of the heating unit.

15. An electrical equipment comprising;
 a heating unit that generates heat;
 a temperature detecting unit that detects temperature of the heating unit;
 an operational mode detecting unit that detects a first mode and a second mode; and
 a control unit that controls the temperature of the heating unit to fall within a range from a first temperature to a second temperature lower than the first temperature when the operational mode detecting unit detects the first mode, the control unit controlling the temperature of the heating unit to fall within a range from a third temperature to a fourth temperature lower than the third temperature when the operational mode detecting unit detects the second mode, wherein a difference between the third temperature and the fourth temperature is greater than a difference between the first temperature and the second temperature.

16. The electrical equipment according to claim 15, wherein the third temperature is lower than the first temperature.

17. The electrical equipment according to claim 16, further comprising a switching unit that is selectively turned ON and OFF, the switching unit supplying an electric current to the heating unit when the switching unit is ON, the heating unit generating heat when supplied with the electric current, wherein the control unit renders the switching unit ON and OFF by selectively outputting a first signal having a first portion and a second portion following the first portion, the switching unit is intermittently turned ON in accordance with the first portion of the first signal.

18. The electrical equipment according to claim 17, further comprising an operational mode setting unit that selectively set an operational mode to a first mode and a second mode, wherein when the mode detecting unit detects either the first mode or the second mode, the control unit outputs the first signal after outputting a second signal, the first signal having the first portion having a number of pulses each having a high level duration and a low level duration, the second signal having a first portion and a second portion, the first portion of the second signal having a number of pulses each having a high level duration and a low level duration, wherein a total duration of the high level durations of the pulses of the first portion of the second signal is greater than a total duration of the high level durations of the pulses of the first portion of the first signal.

19. The electrical equipment according to claim 18, wherein the heating unit is a lamp.

20. The electrical equipment according to claim 19, further comprising a memory that stores data on the first signal and the second signal.

21. The electrical equipment according to claim 17, wherein the switching unit is continuously ON when receiving the second portion of the first signal.

* * * * *